United States Patent [19]

Yoshida et al.

[11] Patent Number: 4,721,610
[45] Date of Patent: Jan. 26, 1988

[54] PROCESS FOR PRODUCING METAL OXIDE PARTICLES HAVING A VERY SMALL AND UNIFORM SIZE

[75] Inventors: Kozaburo Yoshida; Akio Nishida; Akira Ueki, all of Ube, Japan

[73] Assignee: UBE Industries, Ltd., Japan

[21] Appl. No.: 798,887

[22] Filed: Nov. 18, 1985

[30] Foreign Application Priority Data

Nov. 19, 1984 [JP] Japan .................................. 59-243871

[51] Int. Cl.$^4$ .............................................. C01F 5/04
[52] U.S. Cl. ...................................... 423/636; 423/592; 423/604; 423/605; 423/617; 423/618; 423/620; 423/622; 423/624; 423/625
[58] Field of Search ................................. 423/617, 636

[56] References Cited

U.S. PATENT DOCUMENTS

| 1,940,125 | 12/1933 | Handwerk | 423/636 |
| 2,177,551 | 10/1939 | Perkins et al. | 423/617 |
| 2,267,720 | 12/1941 | Cyr et al. | 423/636 |
| 2,331,599 | 10/1943 | Cyr | 423/623 |
| 2,653,078 | 9/1952 | Lane | 423/636 |
| 3,525,595 | 8/1970 | Zirngibl et al. | 423/617 |
| 4,370,304 | 1/1983 | Hendriks et al. | 423/310 |

FOREIGN PATENT DOCUMENTS

| 139208 | 5/1970 | Czechoslovakia | 423/636 |
| 87798 | 7/1983 | European Pat. Off. | 423/636 |
| 969532 | 6/1958 | Fed. Rep. of Germany | 423/636 |
| 1240838 | 3/1967 | Fed. Rep. of Germany | 423/636 |
| 1592208 | 11/1970 | Fed. Rep. of Germany | 423/636 |
| 36-3359 | 4/1951 | Japan | 423/636 |
| 60-161327 | 8/1985 | Japan | 423/636 |
| 629406 | 9/1949 | United Kingdom | 423/636 |
| 661685 | 11/1951 | United Kingdom | 423/636 |
| 701187 | 12/1953 | United Kingdom | 423/636 |
| 1039762 | 8/1966 | United Kingdom | 423/636 |
| 1121088 | 7/1968 | United Kingdom | 423/636 |
| 1225643 | 3/1971 | United Kingdom | 423/636 |
| 1562966 | 3/1980 | United Kingdom | 423/636 |
| 2076521 | 11/1983 | United Kingdom | 423/636 |
| 2141701 | 1/1985 | United Kingdom | 423/636 |

Primary Examiner—John Doll
Assistant Examiner—Wayne A. Langel
Attorney, Agent, or Firm—Finnegan, Henderson, Farabow, Garrett & Dunner

[57] ABSTRACT

Very small and uniform metal oxide particles are produced by a process including the steps of ejecting a metal vapor-containing gas into a metal-oxidizing region through a nozzle and ejecting a molecular oxygen-containing gas into the metal-oxidizing region through another nozzle in such a manner that the streams of the metal vapor-containing gas and the molecular oxygen-containing gas are smashed into each other to produce a turbulent flow diffusing flame in which the metal vapor is oxidized into very small and uniform metal oxide particles.

6 Claims, 3 Drawing Figures

PROCESS FOR PRODUCING METAL OXIDE PARTICLES HAVING A VERY SMALL AND UNIFORM SIZE

BACKGROUND OF THE INVENTION

1. Field of the Invention

The present invention relates to a process for producing metal oxide particles having a very small and uniform size. More particularly, the present invention relates to a process for producing very small and uniform metal oxide particles with a high productivity and efficiency by oxidizing metal vapor in a turbulent diffusing flame.

2. Description of the Prior Art

It is well known that fine particles of various metal oxides, for example, magnesium oxide and calcium oxide, exhibit excellent heat resistance and electrical insulating property and, therefore, are highly useful as ceramic materials, catalysts, pigments, or fillers in a wide range of industries. Especially, it was recently discovered that very fine metal oxide particles having a very small size of 0.1 $\mu$m or less exhibit various unique properties different from those of coarse metal oxide particles. For example, very fine metal oxide particles exhibit excellent chemical reactivity due to their large total surface area and the high surface energy of the particles. Also, very fine metal oxide particles exhibit different magnetic and optical properties from those of usual metal oxide particles in the form of a bulk due to the very small volume of the individual particles.

The above-mentioned specific properties open up new fields of application for very fine metal oxide particles, for example, starting materials for catalysts, sintered materials, porous materials, sensor materials, magnetic materials, and pigments.

It is known that the fine metal oxide particles can be produced by a liquid phase reaction method or a gas phase reaction method.

In the liquid phase reaction method, a metal salt is deposited from its aqueous solution and the deposited metal salt is collected and thermally decomposed to form corresponding metal oxide particles. This method is, however, not usually utilized to produce metal oxide particles having a small size of 0.1 $\mu$m or less, because the resultant fine metal oxide particles easily agglomerate to form secondary agglomerates having a large size during the process.

In the gas phase reaction method, it is believed that very fine metal oxide particles can be produced by carrying out the metal oxide-forming reaction under appropriate conditions, because, in this method, the resultant fine metal oxide particles do not easily agglomerate, the formation of secondary agglomerates is very small, and the reaction conditions can be easily decided.

The gas phase reaction method can be classified into a first method, wherein metal vapor is brought into contact with an oxygen-containing gas at a temperature at which the metal vapor can be oxidized into fine metal oxide particles, and a second method, wherein metal oxide particles are produced in a combustion flame generated by the combustion of a corresponding metal substance which is capable of being oxidized.

In the first gas phase reaction method, for example, metallic magnesium is heated within an inert gas atmosphere to generate magnesium vapor, the magnesium vapor is flowed into an oxidizing region, and a flow of a molecular oxygen-containing gas is introduced into the oxidizing region countercurrently to the flow of the magnesium vapor so as to allow the magnesium vapor to contact and react with the molecular oxygen-containing gas. This method for producing fine magnesium oxide particles having a high purity is disclosed in Czechoslovakian Pat. No. 139,208.

Also, Takanori Watari, Kazumi Nakayoshi and Akio Kato, Journal of Japanese Chemical Society, No. 6, pages 1075 to 1076 (1984), disclose a process for producing fine magnesium oxide particles, in which process metallic magnesium is heated, and the resultant magnesium vapor is introduced together with argon gas into a reactor and is mixed with an oxygen ($O_2$) nitrogen ($N_2$) mixture gas.

In the above specifically mentioned processes, in order to produce very fine metal oxide particles having a very small size, it is usually necessary to dilute the metal vapor with a large amount of an inert gas and then to bring the diluted metal vapor-containing gas into contact with a molecular oxygen-containing gas. This process is disadvantageous judging from the very high production cost of the resultant fine metal oxide particles and the very complicated and expensive production apparatus.

The afore-mentioned second method, wherein metal oxide particles are produced by oxidizing a metal substance capable of being converted into a corresponding metal oxide in a combustion flame, is classified into a premixing-combustion method and a diffusion combustion method.

In the premixing-combustion method, a combustible metal substance-containing gas and a molecular oxygen-containing gas are mixed and the mixed gas is ejected through a burner into an oxidizing region. In this method, for example, a metal-halogen compound which is capable of being converted into a corresponding metal oxide is mixed with a combustible material gas, for example, hydrogen gas or methane gas, which are converted into hydrogen oxide and/or carbon dioxide by combustion, and the resultant mixed gas is burned by using a watering can type burner to generate a number of thin flames. This process is disclosed in Japanese Examined Patent Publication (Kokoku) No. 36-3359. This method is, however, disadvantageous because a number of fiber-shaped metal oxide agglomerates are formed around the nozzles of the burner and the size of the resultant metal oxide particles is not even.

In order to produce metal oxide particles having uniform size, it was attempted to use a highly reactive starting material such as metal vapor in place of the metal halide compound having a relatively low reactivity. In the case where a metal halide compound is used, the reaction of the metal halide compound with a molecular oxygen-containing gas is carried out at a moderate reaction rate due to the relatively low reactivity of the metal halide compound. In the case where metal vapor is used, however, the reaction of the metal vapor with the molecular oxygen-containing gas is immediately initiated upon mixing and progresses at such a very high reaction rate that it is difficult to control the reaction rate to an appropriate level. Even if the reaction rate at the initial stage of the reaction at which the metal vapor is mixed with the molecular oxygen-containing gas in a mixer and at which the mixed gas is fed into a burner could be controlled, there is a high possibility of dangerous backfires from the burner to the mixer. Due to the above-mentioned possibility, in the premixing-combustion method, the starting metal material should be a metal compound having a relatively low reactivity and a high reactive starting material such as metal vapor cannot be utilized.

The diffusion-combustion method generally relates to a process in which a combustible gas and a molecular oxygen-containing gas are ejected into an oxidizing region through separate ejecting nozzles and the ejected combustible gas and molecular oxygen-containing gas contact and mix with each other to generate a diffusing flame in the oxidizing region to burn the combustible gas.

Usually, the diffusion-combustion method is applied to ordinary combustion of LPG or heavy oil. It has never been applied to the production of metal oxides.

The diffusion-combustion method includes a laminar flow diffusing flame method and a turbulent flow diffusing flame method.

In the laminar flow diffusing flame method, a combustible gas contacts a molecular oxygen-containing gas under a laminar flow diffusing condition and is burnt in a resultant laminar flow diffusing flame. In this laminar flow diffusing flame, the combustible gas and the molecular oxygen-containing gas, which are in a laminar flow condition, have an interface formed therebetween and diffuse through the interface into each other. The result is a laminar flow type flame having an interface formed between a combustible gas-diffused molecular oxygen flame and a diffused combustible gas-molecular oxygen-containing gas flame.

According to the present inventor's research, the laminar flow diffusing flame has a relatively large length. This feature causes the residing time of the resultant oxide particles in the flame to be long. Therefore, the resultant oxide particles grow in the flame, and the size of the grown particles is undesirably large and uneven. For example, the residing (growing) time of a metal oxide particle produced at a location close to the rear end of the flame is remarkably longer than that produced at a location close to the front end of the flame. This fact results in a large distribution range of the sizes of the resultant metal oxide particles.

Accordingly, in order to produce very small and uniform metal oxide particles by the laminar flow diffusing flame method, it is necessary to limit the partial pressure of the metal vapor in the metal-oxidizing region to a very low level, for example, 0.09 atmosphere, and the reaction temperature to a low level, for example, 800° C. to 1,600° C. This necessity sometimes causes the efficiency of the metal oxide production to be unsatisfactorily low. This type of process is disclosed by Japanese Unexamined Patent Publication (Kokai) No. 59-213619.

SUMMARY OF THE INVENTION

An object of the present invention is to provide a process for producing metal oxide particles having a very small and uniform size at a high efficiency.

Another object of the present invention is to provide a process for producing metal oxide particles having a very small and uniform size while easily controlling the average size of the particles to a desired level and the distribution of the size of the particles to a small range.

Still another object of the present invention is to provide a process for producing metal oxide particles having a very small and uniform size at a low cost without using a complicated reaction apparatus.

The above-mentioned objects can be attained by the process of the present invention comprising the steps of:

(A) ejecting a stream of a metal vapor-containing gas into a metal-oxidizing region through a metal vapor-containing gas nozzle; and (B) ejecting a stream of a molecular oxygen-containing gas into the metal-oxidizing region through a molecular oxygen-containing gas nozzle, in which process the ejecting directions of the metal vapor-containing gas and molecular oxygen-containing gas stream intersect each other within the metal-oxidizing region to allow the ejected metal vapor and molecular oxygen to contact each other and to generate a turbulent flow diffusing flame in which the metal vapor is converted into very small and uniform metal oxide particles.

DESCRIPTION OF THE PREFERRED EMBODIMENTS

Figure 1:
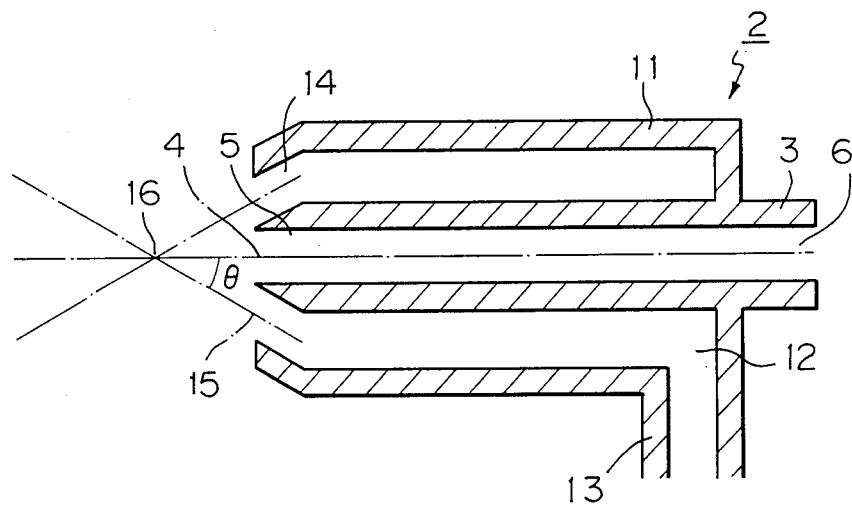
FIG. 1 is an explanatory cross-sectional view of an embodiment of an apparatus for carrying out the process of the present invention.

In the process of the present invention, the oxidation of a metal vapor is carried out in a turbulent flow diffusing flame which has a small length. Therefore, the resultant metal oxide particles reside in the flame for a short time and, therefore, substantially do not grow in the flame. Accordingly, the resultant metal oxide particles have a very small size, and the distribution range of the size of the particles is very narrow.

Usually, the metal oxide particles produced in accordance with the process of the present invention have an average size of from 0.1 $\mu$m to 0.01 $\mu$m. Also, in the process of the present invention, it is possible to control the average size of the resultant metal oxide particles to a desired level by controlling the conditions of the turbulent flow diffusing flame.

The metals to which the process of the present invention can be applied are preferably selected from those having a boiling point of 1500° C. or less under atmospheric pressure. For example, the metals are preferably selected from the group consisting of magnesium, zinc, and calcium. Especially, the process of the present invention is preferably applied to the production of fine particulate magnesium oxide and zinc oxide, more preferably, fine particulate magnesium oxide.

In the process of the present invention, a metal vapor-containing gas is ejected into a metal-oxidizing region through a metal vapor-containing gas nozzle. The metal vapor can be produced by any known methods. Usually, the metal vapor is generated by heating a solid metal in a retort at a boiling temperature of the metal or more in accordance with, for example, a metal-vaporizing method as disclosed in Japanese Unexamined Patent Publication (Kokai) No. 60-161327. The heating operation of the solid metal in the retort may be carried out in an inert gas atmosphere.

The metal vapor-containing gas may consist of a metal vapor alone or a mixture of a metal vapor with at least one inert gas heated to the boiling temperature of the metal or more. The inert gas can be selected from the group consisting of argon, helium, neon, and krypton.

In the process of the present invention, a molecular oxygen-containing gas is ejected separately from the metal vapor-containing gas into the metal-oxidizing region through a molecular oxygen-containing gas nozzle.

The molecular oxygen-containing gas may consist of pure oxygen gas alone or a mixture of oxygen with one or more other gases which are inert to the metal vapor. Usually, the molecular oxygen-containing gas consists of air.

The quantity of the molecular oxygen-containing gas to be fed into the metal-oxidizing region is not limited to a specific level. However, it is usually preferable that the partial pressure of molecular oxygen in the molecular oxygen-containing gas be more than twice that of the metal vapor in the metal vapor-containing gas.

The partial pressures of the metal vapor and the molecular oxygen can be easily adjusted to desired values by controlling the vaporizing rate of the metal and the flow rate of the molecular oxygen.

When the partial pressure of the molecular oxygen is twice or less that of the metal vapor, the oxidation of the metal vapor may be effected incompletely and the resultant metal oxide particles may have an undesirably large average size.

In the process of the present invention, the metal vapor-containing gas and the molecular oxygen-containing gas are ejected separately from each other into the metal-oxidizing region through separate nozzles in such a manner that the ejecting directions of the metal vapor-containing gas and the molecular oxygen-containing gas intersect each when within the metal-oxidizing region. This feature causes the streams of the ejected metal vapor-containing gas and molecular oxygen-containing gas to contact each other and to generate a turbulent flow diffusing flame in the metal-oxidizing region.

There is no specific limitation in the types of the metal vapor-containing gas nozzle and the molecular oxygen-containing gas nozzle and in the methods for ejecting the metal vapor-containing gas and the molecular oxygen-containing gas, as long as the ejected two gases can generate the turbulent flow diffusing flame.

However, it is preferable that the ejecting operations of the metal vapor-containing gas and the molecular oxygen-containing gas be carried out by using a core-in-sheath type composite nozzle structure in which a core nozzle for ejecting a metal vapor-containing gas therethrough is placed in a sheath nozzle for ejecting a molecular oxygen-containing gas therethrough and extends along the longitudinal axis of the sheath nozzle, the ejecting direction of the core nozzle is on the longitudinal axis of the core nozzle, and the ejecting direction of the sheath nozzle intersects the ejecting direction of the core nozzle at a location within the metal-oxidizing region.

Referring to FIG. 1, the metal oxide-producing apparatus 1 is provided with a core-in-sheath type composite nozzle 2. In the composite nozzle 2, a core nozzle 3 extends along a longitudinal axis 4 thereof and has a metal vapor-containing gas-ejecting front end 5 and a rear end 6 to a supply source of the metal vapor (not shown). The metal vapor-containing gas can be ejected in a direction along the longitudinal axis 4 of the core nozzle 3.

In the composite nozzle 2, a sheath nozzle 11 extends along the same longitudinal axis thereof as the longitudinal axis 4 of the core nozzle 3 in a concentric circular relationship to the core nozzle. The sheath nozzle 11 is provided with a rear end portion 12 thereof connected to a supply source (not shown) of a molecular oxygen-containing gas through a conduit 13 and a front end 14 thereof through which the molecular oxygen-containing gas is ejected. The front end 14 of the sheath nozzle 11 is formed so that the ejecting direction 15 of the molecular oxygen-containing gas intersects the longitudinal axis 4 of the core nozzle 3 at a point 16 located within a metal oxidizing region. Therefore, the streams of the molecular oxygen-containing gas and the metal vapor-containing gas can intersect each other at angles $\theta$ at a point 16. Generally, the intersecting angles $\theta$ are preferably 90 degrees or less, more preferably, in the range of from 10 to 90 degrees. If the intersecting angle $\theta$ is zero, sometimes a laminar flow diffusing flame is generated. When the intersecting angle $\theta$ is more than 90 degrees, it causes such disadvantages that metal oxide is formed and deposits in the core nozzle so as to block it.

Generally, it is also preferable that the flow rate of the molecular oxygen-containing gas be at least 0.7 time, more preferably, 1 to 15 times that of the metal vapor-containing gas. Usually, with a decrease in the intersecting angles $\theta$, it is preferable to increase the ratio of the flow rate of molecular oxygen-containing gas to that of the metal vapor-containing gas.

In the process of the present invention, the ejected molecular oxygen-containing gas stream contacts the metal vapor-containing gas stream so as to generate a turbulent flow diffusing flame having a small length. The residing time of the resultant metal oxide particles in the flame is preferably in a very small value of from 0.0001 to 0.01 second. For attaining the above-mentioned residing time, it is preferable to control the length of the turbulent flow diffusing flame to a value of 10 cm or less, more preferably, from 0.5 to 5 cm.

In the short turbulent flow diffusing flame, the metal vapor is immediately oxidized into the corresponding metal oxide particles. The short length of the diffusing flame causes the residing time of the resultant metal oxide particles to be very short and, therefore, prevents the undesirable growth of the particles. The resultant metal oxide particles have a very small average size and exhibit a very small distribution range of the size of the particles.

The resultant metal oxide particles are introduced together with the remaining gas from the metal-oxidizing region into a metal oxide particle-collecting region and are separated from the remaining gas by conventional means, for example, a filter and/or a cyclone separator.

The present invention will be illustrated in detail by the following examples and comparative examples.

EXAMPLE 1

The core-in-sheath type composite nozzle as indicated in FIG. 1 was used for the production of fine magnesium oxide particles.

The composite nozzle was provided with a metal vapor-containing gas nozzle having an inside diameter of 4 mm and an outside diameter of 18 mm and a molecular oxygen-containing gas nozzle having an inside diameter of 20 mm and an outside diameter of 30 mm. The intersecting angles θ between the ejecting directions of the metal vapor-containing gas nozzle and the molecular oxygen-containing gas nozzle was 10 degrees.

Metallic magnesium was heated at a temperature of 1200° C. to provide magnesium vapor at a vaporizing rate of 1.2 g/min, and the resultant magnesium vapor was ejected into a magnesium-oxidizing region through the metal vapor-containing gas nozzle at a flow velocity of 7.6 m/sec. Separately, air was ejected into the magnesium-oxidizing region through the molecular oxygen-containing gas nozzle at a flow velocity of 12 m/sec. The ratio of the partial pressure of molecular oxygen to that of the metal vapor was 7.0. The ejected streams of the magnesium vapor and air generated a turbulent flow diffusing flame having a length of 4.0 cm. The residing time of the resultant magnesium oxide particles in the flame was 0.0053 second. the resultant magnesium oxide particles were collected by a conventional collecting device.

The resultant magnesium oxide particles had an average size of 0.035 μm.

Figure 2:
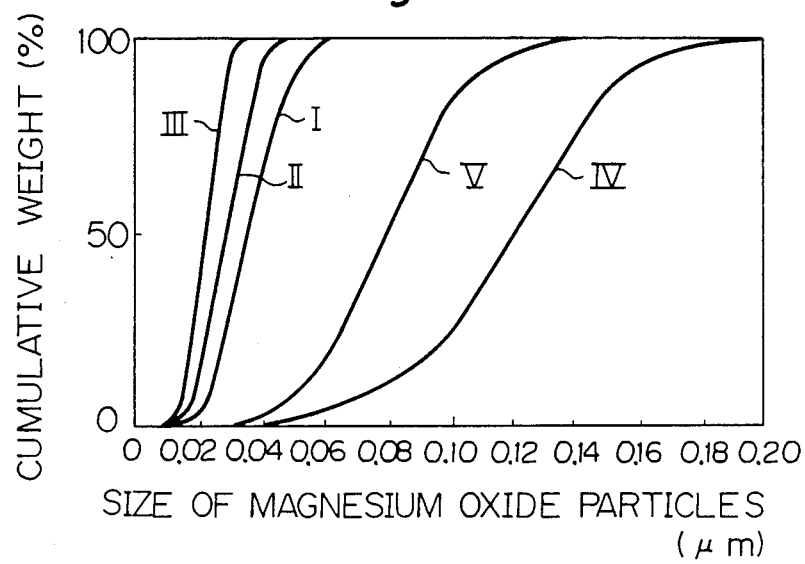
FIG. 2 is a diagram showing the relationship between the particle size distribution of each metal oxide I, II, and III produced in accordance with the process of the present invention and of comparative metal oxide IV and V produced by a conventional process and the cumulative weight of each of the metal oxides I to V.

The distribution of size of the resultant particles and the cumulative weight of the particles are shown by line I in FIG. 2.

The average size of the particles was determined in accordance with the following equation:

$$\text{Average size} = a/(S \times \rho)$$

wherein S represents a specific surface area of the particles determined by a nitrogen absorption method, a represents a coefficient of the shape of the particles, i.e., 6, and ρ represents of a density of the particles, i.e., 3.58 g/cm³.

EXAMPLE 2

The same procedures as those described in Example 1 were carried out except that the flow velocity of the ejected air was 30 m/second, and the ratio in partial pressure of the molecular oxygen to the magnesium vapor in the magnesium-oxidizing region was 18.

The resultant turbulent flow diffusing flame had a length of 1.5 cm. The residing time of the resultant magnesium oxide particles in the flame was 0.0020 second. The resultant magnesium oxide particles had an average size of 0.025 μm and exhibited the distribution of the size of the particles and the cumulative weight of the particles as indicated by line II in FIG. 2.

EXAMPLE 3

The same procedures as those described in Example 1 were carried out except that the flow velocity of the ejected air was 60 m/second, and the ratio in partial pressure of the molecular oxygen to the magnesium vapor in the magnesium-oxidizing region was 36.

The resultant turbulent flow diffusing flame had a length of 1.0 cm. The residing time of the resultant magnesium oxide particles in the flame was 0.0013 second. The resultant magnesium oxide particles had an average size of 0.020 μm and exhibited the distribution of the size of the particles and the cumulative weight of the particles as indicated by line III in FIG. 2.

COMPARATIVE EXAMPLE 1

The same procedures as those described in Example 1 were carried out except that the intersecting angle θ was zero, the flow velocity of the magnesium vapor was 7.6 m/second, the flow velocity of the ejected air was 2 m/second, and the ratio in partial pressure of the molecular oxygen to the magnesium vapor in the magnesium-oxidizing region was 1.

The resultant flame was a laminar flow diffusing flame and had a length of 16 cm. The residing time of the resultant magnesium oxide particles in the flame was 0.021 second. The resultant magnesium oxide particles had an average size of 0.120 μm and exhibited the distribution of the size of the particles and the cumulative weight of the particles as indicated by line IV in FIG. 2.

COMPARATIVE EXAMPLE 2

The same procedures as those described in Comparative Example 1 were carried out except that the flow velocity of the ejected air was 4 m/second.

The resultant laminar flow diffusing flame had a length of 10 cm. The residing time of the resultant magnesium oxide particles in the flame was 0.013 second. The resultant magnesium oxide particles had an average size of 0.08 μm and exhibited the distribution of the size of the particles and the cumulative weight of the particles as indicated by line V in FIG. 2.

EXAMPLE 4

The same procedures as those described in Example 1 were carried out except that the intersecting angle θ was 90 degrees, the flow velocity of the ejected air was 6 m/second, and the ratio in partial pressure of the molecular oxygen to the magnesium vapor in the magnesium-oxidizing region was 3.

The resultant turbulent flow diffusing flame had a length of 3.0 cm. The residing time of the resultant magnesium oxide particles in the flame was 0.0039 second. The resultant magnesium oxide particles had an average size of 0.030 μm and exhibited the distribution of the size of the particles and the cumulative weight of the particles as indicated by line Ia in FIG. 3.

EXAMPLE 5

The same procedures as those described in Example 1 were carried out except that the intersecting angle θ was 90 degrees, the flow velocity of the ejected air was 12 m/second, and the ratio in partial pressure of the molecular oxygen to the magnesium vapor in the magnesium-oxidizing region was 7.

The resultant turbulent flow diffusing flame had a length of 1.5 cm. The residing time of the resultant magnesium oxide particles in the flame was 0.0020 second. The resultant magnesium oxide particles had an average size of 0.025 μm and exhibited the distribution of the size of the particles and the cumulative weight of the particles as indicated by line IIa in FIG. 3.

EXAMPLE 6

The same procedures as those described in Example 1 were carried out except that the intersecting angle θ was 90 degrees, the flow velocity of the ejected air was 30 m/second, and the ratio in partial pressure of the molecular oxygen to the magnesium vapor in the magnesium-oxidizing region was 18.

The resultant turbulent flow diffusing flame had a length of 1.0 cm. The residing time of the resultant magnesium oxide particles in the flame was 0.0013 second. The resultant magnesium oxide particles had an average size of 0.020 μm and exhibited the distribution of the size of the particles and the cumulative weight of the particles as indicated by line IIIa in FIG. 3.

Figure 3:
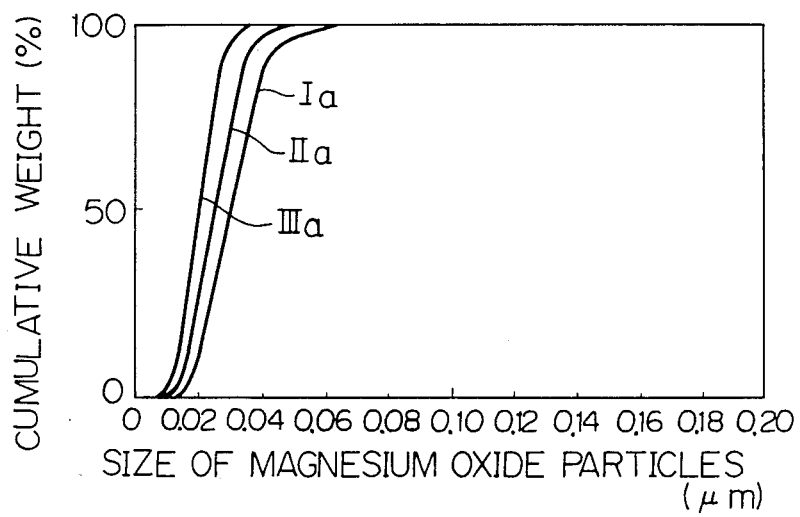
FIG. 3 is a diagram showing another relationship between the size distribution of each metal oxide Ia, IIa, and IIIa produced in accordance with the process of the present invention and the cumulative weight of each metal oxide.

From the above-described Examples 1 to 6 and Comparative Examples 1 and 2, and FIGS. 2 and 3, it is clear that the metal oxide particles produced in accordance with the present invention had a very small size and exhibited a very narrow distribution range of size as shown in FIGS. 2 and 3. When a laminar flow diffusing method was applied as described in Comparative Examples 1 and 2, the resultant metal oxide particles had a large size and exhibited a wide distribution range of size.

The turbulent flow diffusing flame is very effective for producing fine metal oxide particles having a very small and uniform size.

We claim:

1. A process for producing magnesium oxide particles having a very small and uniform size, comprising (A) ejecting separately a stream of a magnesium vapor-containing gas into a stream of a molecular oxygen-containing gas into a magnesium-oxidizing region through a core-in-sheath type composite nozzle whereby said magnesium vapor-containing gas is ejected through said core nozzle to form a magnesium vapor-containing core gas stream, and said molecular oxygen-containing gas is ejected through said sheath nozzle in the form of a hollow tube surrounding the core nozzle and having an ejecting front end portion thereof directed at an angle of 90 degrees or less to the longitudinal axis of the core nozzle to form a molecular oxygen-containing gas sheath stream; and (B) causing said ejected molecular oxygen-containing sheath gas stream to be converged into and to come into contact with said magnesium vapor-containing core gas stream to generate a turbulent flow diffusing flame having a length of from 0.5 to 5 cm in which flame the magnesium vapor is immedietly converted into very small and uniform magnesium opxide particles having an average size of from 0.01 to 0.1 μm.

2. The process as claimed in claim 1 wherein the molecular oxygen-containing gas contaim consists of oxygen gas alone 3. The process as claimed in claim 1, wherein the molecular oxygen-containing gas consists of air.

4. The process as claimed in claim 1, wherein the partial pressure of oxygen in the ejected molecular oxygen-containing gas is to at least twice the partial pressure of the metal vapor in the ejected metal vapor-containing gas.

5. The process as claimed in claim 1 wherein the metal vapor-containing gas stream and the molecular oxygen-containing gas stream intersect each other at an intersecting angle $\theta$ in the range of from 10 to 90 degrees.

6. The process as claimed in claim 1 wherein the resultant metal oxide particles reside in the turbulent diffusing flame for 0.0001 to 0.01 second.

* * * * *